United States Patent [19]
Vuillet et al.

[11] Patent Number: 5,775,637
[45] Date of Patent: Jul. 7, 1998

[54] DEVICE FOR REDUCING THE VIBRATIONS ON THE STRUCTURE OF A HELICOPTER

[75] Inventors: Alain Vuillet, Bouc Bel Air; Elio Zoppitelli, Velaux, both of France

[73] Assignee: Eurocopter France, Marignane Cedex, France

[21] Appl. No.: 762,614

[22] Filed: Dec. 9, 1996

[30] Foreign Application Priority Data

Dec. 8, 1995 [FR] France .................. 95 14554

[51] Int. Cl.$^6$ .................................. B64C 27/06
[52] U.S. Cl. .................. 244/17.11; 244/75 A; 188/379; 188/380
[58] Field of Search .................. 244/17.11, 17.13, 244/17.27, 75 A; 188/378, 379, 380

[56] References Cited

U.S. PATENT DOCUMENTS

| | | |
|---|---|---|
| 3,429,051 | 2/1969 | Lutz et al. . |
| 4,042,070 | 8/1977 | Flannelly ............ 244/17.27 |
| 4,247,061 | 1/1981 | Kuczynski et al. . |
| 4,766,984 | 8/1988 | Gaffey et al. ........ 244/17.27 |
| 4,974,794 | 12/1990 | Aubry et al. . |

FOREIGN PATENT DOCUMENTS

| | | |
|---|---|---|
| 0075877 | 4/1983 | European Pat. Off. . |
| 0335786 | 10/1989 | European Pat. Off. . |
| 0361125 | 4/1990 | European Pat. Off. . |
| 0098657 | 1/1994 | European Pat. Off. . |
| 9209913 | 7/1993 | Germany . |
| 4236480 | 5/1994 | Germany . |

OTHER PUBLICATIONS

Patent Abstracts of Japan, vol. 10, No. 167, 13 Jun. 1986 (M-488); Abstract of Japanese Patent No. 61017736.

*Primary Examiner*—S. Joseph Morano
*Attorney, Agent, or Firm*—Fisher, Christen & Sabol

[57] ABSTRACT

A device for reducing the vibrations generated on the structure of a helicopter. The helicopter includes a structure with a tail boom and a fin. The structure has a longitudinal vertical mid-plane. The helicopter also has a main lift and propulsion rotor which generate an aerodynamic flow passing through the rotor and induce vibrations on the structure. A damping device for reducing the vibrations has a longitudinal chamber which is equipped with at least one central restriction, which has two elastically urged mobile lateral walls and which is full of a fluid representing an oscillating mass. The damping device is mounted in the tail boom close to the fin so that the direction of travel of the oscillating mass is at least substantially orthogonal to the longitudinal vertical mid-plane.

5 Claims, 3 Drawing Sheets

DEVICE FOR REDUCING THE VIBRATIONS ON THE STRUCTURE OF A HELICOPTER

The present invention relates to a device for reducing the vibrations generated on the structure of a helicopter by the aerodynamic flow through the main lift and propulsion rotor of said helicopter.

It is known that the main rotor, as it turns, draws in the air situated above it and discharges it downward, accelerating it, so as to create a moving stream of air. The pressure and the velocity of the air vary through this air stream. The flow of this air over the structure of the helicopter generates vibrations, especially lateral and/or vertical vibrations, which can be felt especially by those at the controls, and are generally called "tail shake" in aeronautical parlance.

The vibrations thus generated are mainly due to the excitation, caused by the aforementioned aerodynamic flow, of the natural modes of the largely undamped structure of the helicopter, especially of the first mode of lateral and/or vertical bending of the tail boom of the helicopter. The vibrations due to the excitation of this first mode of lateral and/or vertical bending generally have a frequency of a few hertz and are extremely troublesome.

The various vibrations thus generated have numerous drawbacks, especially:

with respect to the comfort of the crew and of the passengers, with respect to the fatigue life of the components and equipment, and with respect to the operation of weapon systems when the helicopter is thus equipped.

The object of the present invention is to overcome the aforementioned drawbacks. It relates to a device, of reduced cost and bulk, which can be produced easily, for "passively", that is to say without acting on the control of members of the helicopter, reducing vibrations generated on the structure of said helicopter by the aerodynamic flow through the main lift and propulsion rotor of said helicopter, said vibrations having a main direction of propagation.

To this end, according to the invention, said device is noteworthy in that it includes a damping means with oscillating means and in that it is mounted, via two ends which form a line substantially parallel to the direction of travel of the oscillating mass, inside the structure of the helicopter, close to the antinode of the vibrations to be reduced, so that the direction of travel of the oscillating mass is substantially parallel to said main direction of propagation.

Thus, by virtue of the invention, an effective device of reduced cost and bulk which can additionally be produced easily is obtained for reducing the vibrations mentioned above and thus overcoming the aforementioned drawbacks.

Advantageously, the device in accordance with the invention is mounted in the tail boom of the helicopter, close to the fin of said helicopter, which makes it possible effectively to reduce the aforementioned vibrations which are due to the excitation of the first mode of lateral and/or vertical bending of said tail boom and which are extremely troublesome.

In a particularly advantageous embodiment of the invention, said device includes a longitudinal chamber, for example of cylindrical shape, which is equipped with at least one central restriction and with two elastically urged mobile lateral walls, and which is full of a fluid, preferably a viscous liquid, representing the oscillating mass.

In a first embodiment, the elastic urging on said mobile walls is produced by pneumatic springs, that is to say by a pressurized gas pressed against the outer faces of said mobile walls, while in the second embodiment, said elastic urging is produced by mechanical springs, for example Belleville washers.

The figures of the appended drawing will make it easy to understand how the invention may be realized. In these figures, identical references denote similar elements.

FIG. 1 diagrammatically illustrates a helicopter equipped with a device in accordance with the invention.

Figure 1:
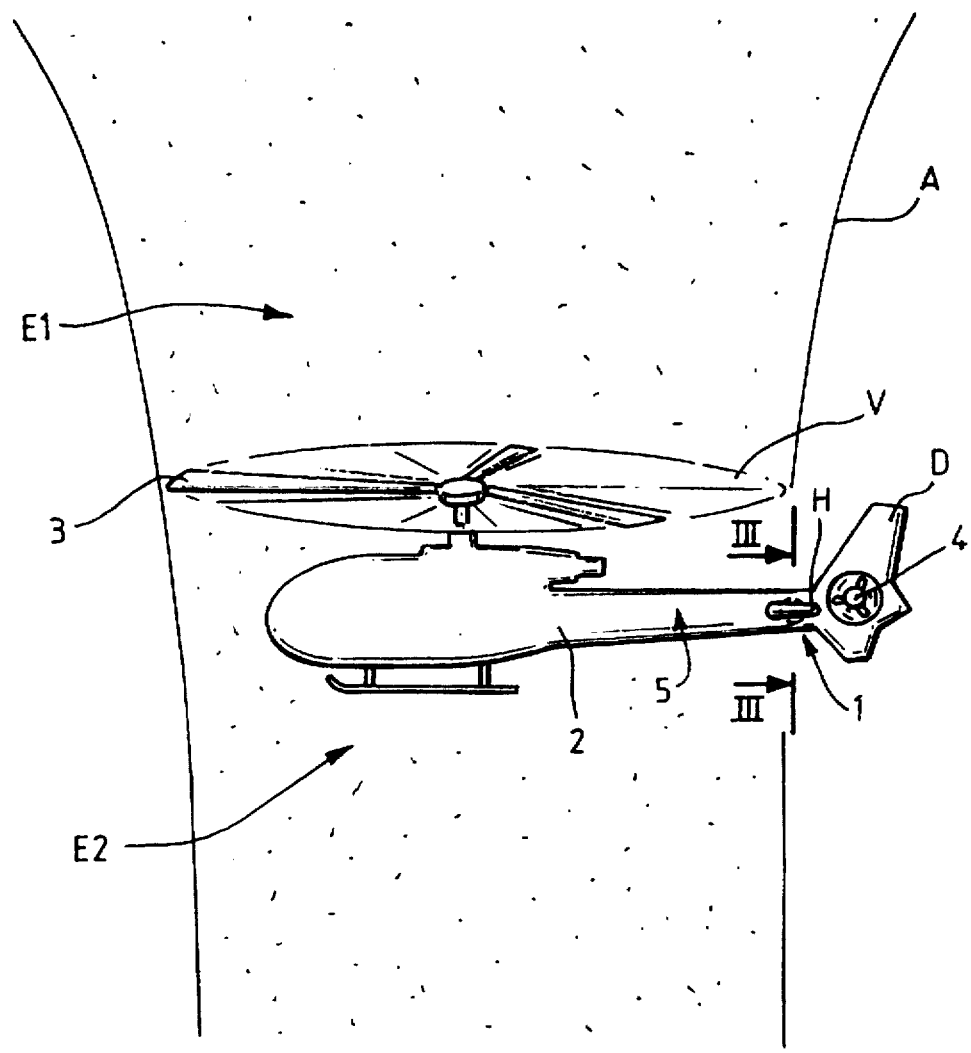

The device 1 in accordance with the invention is mounted on a helicopter 2 represented diagrammatically in FIG. 1 and it is intended to reduce the vibrations, known as "tail shake" in aeronautical parlance, which are generated on the structure of said helicopter 2, as specified below.

In a known way, said helicopter 2 includes, on the one hand, a main lift and propulsion rotor 3 and, on the other hand, a tail rotor 4 intended to combat the torque of said main rotor 3.

It is known that to generate lift and forward propulsion of the helicopter 2, the main rotor 3 draws air from the space E1 situated above it and discharges it toward the space E2 situated below, accelerating it. It thus creates a moving stream of air A, of variable pressure and velocity, of which the diameter in the region of the helicopter 2 is substantially equal to the diameter of the wing structure V, as represented in FIG. 1. On contact with the helicopter 2, this aerodynamic flow causes vibrations of the largely undamped structure of said helicopter 2.

These vibrations, especially but not exclusively lateral ones, are due mainly to excitation by the aerodynamic flow of the natural modes of the helicopter structure 2 and especially of the first mode of lateral and/or vertical bending of the tail boom 5 of the helicopter 2.

The vibrations due to the excitation of this first mode of lateral and/or vertical bending generally have a frequency of a few hertz and are particularly troublesome.

The various vibrations thus generated present drawbacks especially with respect to:

the comfort of the crew and of the passengers, the fatigue life of components and equipment, and the operation of weapon systems, not represented, when the helicopter 2 is thus equipped.

Figure 2:
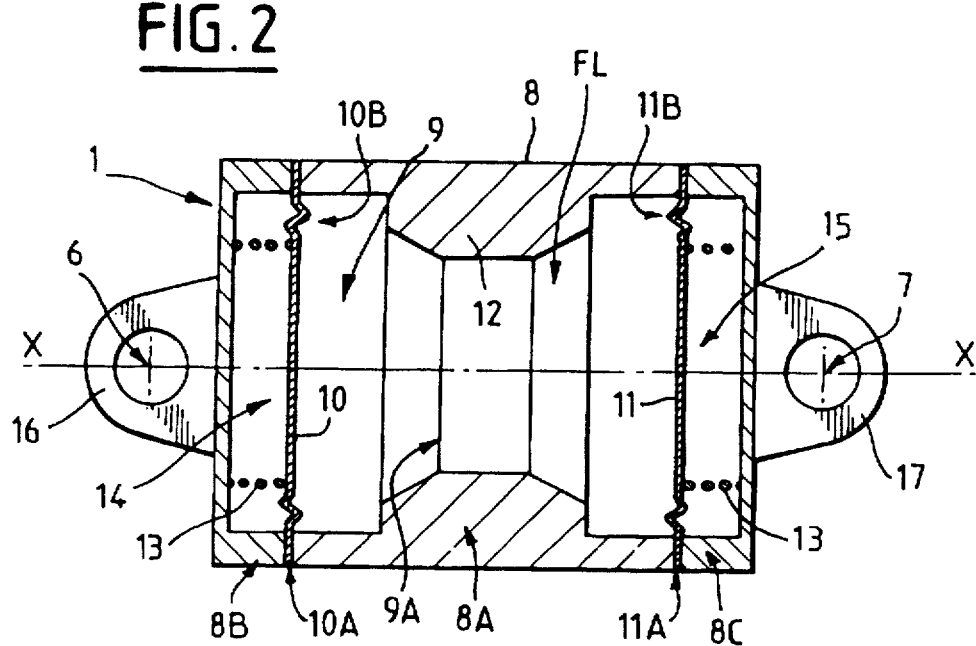
FIG. 2 is a longitudinal section through a device in accordance with the invention.

The device 1 in accordance with the invention and represented in FIG. 2 in a particularly advantageous embodiment, is intended to reduce said vibrations in order to overcome these drawbacks.

To this end, according to the invention, said device 1 includes a damping means with oscillating mass FL, as specified below, and it is mounted, via two ends 6 and 7 which form a line substantially parallel to the direction X—X of travel of the oscillating mass FL, inside the structure of the helicopter 2 close to the antinode of the vibrations to be reduced, so that the direction X—X of travel of the oscillating mass FL is substantially parallel to the main direction of propagation $\vec{DP}$ of said vibrations to be reduced, not represented.

Figure 3:
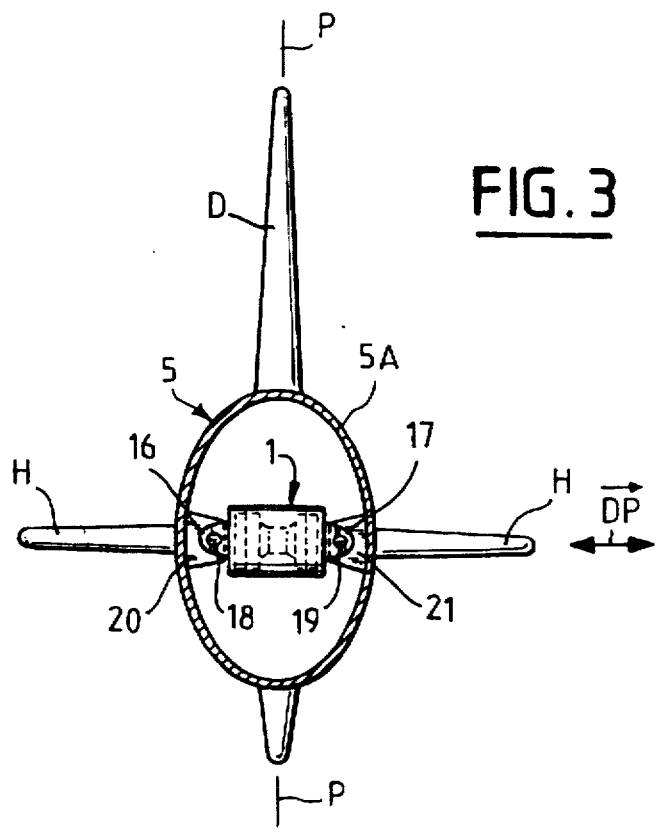
FIG. 3 is a transverse section on III—III of FIG. 1, showing the device of FIG. 2 mounted in the tail boom of the helicopter.

In the embodiment of FIGS. 1 and 3, said main direction of propagation $\vec{DP}$ of the vibrations is assumed to be lateral, that is to say substantially orthogonal to the longitudinal vertical mid-plane P of the helicopter 2, as represented in FIG. 3.

In this case, the device 1 in accordance with the invention is preferably mounted in the structure 5A of the tail boom 5 close to the fin D and horizontal empennage H, the direction X—X of travel of the oscillating mass FL being directed substantially orthogonally to said plane P.

The device 1 thus arranged is capable of substantially reducing the aforementioned extremely troublesome vibrations which are due to the excitation of the first mode of lateral bending of the tail boom 5 and which have a lateral main direction of propagation $\vec{DP}$.

In order to achieve this, in the particularly advantageous embodiment represented, said device 1 includes a cylindrical vessel 8, of axis X—X, forming a chamber 9 which can be filled with pressurized fluid FL, preferably a viscous liquid, representing the oscillating mass.

Said chamber 9 is bounded longitudinally on both sides by mobile walls 10 and 11 specified below, and it has a central restriction 9A due to an internal annular projection 12 integral with the vessel 8 at the center thereof.

Said pressurized fluid FL, which acts as an oscillating mass, can move longitudinally (that is to say along the axis X—X), thanks to said mobile walls 10 and 11 which are elastically urged.

The travel of said fluid FL is restricted by the central restriction 9A of the chamber 9, which makes it possible to generate damping thereby allowing the irksome vibrations to be reduced.

The damping C of said device 1 satisifies the relationship:

$$C = 2 \cdot \alpha \cdot M \cdot \omega \quad (\text{with } \omega = 2 \cdot \pi \cdot F1)$$

in which:

M represents the mass of said fluid F1 introduced into the chamber 9;

F1 represents the natural frequency of the device 1; and

α represents the desired damping, preferably close to 30%.

Moreover, the vessel 8 is formed of three cylindrical lengths joined together, namely a central length 8A and two end lengths 8B and 8C.

As a preference, said central length 8A and said annular projection 12 are made as a single piece.

In addition, the wall 10 is made in the form of a circular membrane set via its peripheral end 10A between the lengths 8A and 8B, and the wall 11 is made in the form of a circular membrane set, via its peripheral end 11A, between the lengths 8A and 8C of the vessel 8.

Said walls 10 and 11 each have a resilient annular region 10B and 11B respectively, formed close to the peripheral end 10A or 10B of the corresponding wall 10 or 11 and providing the flexibility necessary to allow said wall 10 or 11 to move.

The elastic urging of said walls 10 and 11 may be obtained either by means of pneumatic springs, as specified below, or by means of mechanical springs 13 indicated schematically.

By way of mechanical springs, use may especially be made of coil springs or of Bellville washers. Such mechanical springs have the advantage of not being very temperature-sensitive.

However, as a preference, use is made of pneumatic springs consisting of gas introduced, on the one hand, into a chamber 14 formed by the wall 10 and the length 8B of the vessel 8 and, on the other hand, into a chamber 15 formed by the wall 11 and the length 8C of the vessel 8.

The stiffness of said pneumatic springs is adjusted by altering the pressure of the gas in said chambers 14 and 15, using means which are known and not represented.

It will be noted that the sum K of the stiffnesses of the two pneumatic springs thus formed satisifies the relationship $K = M \cdot \omega^2$, M being the mass of the fluid F1 in the chamber 9 and ω the natural pulsation of the device 1.

The device 1 additionally includes a fixing means making it possible to fix said device 1 to the helicopter 2 and comprising two projecting plates 16 and 17 which are arranged on the outside, longitudinally on each side of the vessel 8 and which are each provided with a hole 6 and 7 respectively.

Said device 1 is fixed on the structure 5A of the tail boom 5, as represented in FIG. 3, by means of two journals 18 and 19 which are provided on mounting plates 20 and 21 integral with said structure 5A and which pass through said holes 6 and 7 and are fixed on said projecting plates 16 and 17.

As indicated earlier, the device 1 in accordance with the invention is intended, in the position in which it is mounted in FIG. 3, to reduce lateral vibrations.

Of course, said device 1 may just as easily be used to reduce vibrations having some other main direction of propagation, especially vertical vibrations, that is to say ones parallel to the plane P.

In order to reduce such vertical vibrations, all that is required is for the device 1 to be mounted in the structure 5A in such a way that the axis X—X is substantially parallel to the main direction of propagation of these vertical vibrations.

It will be noted that the device 1 in accordance with the invention can reduce sinusoidal vibrations just as well as random vibrations.

Figure 4:
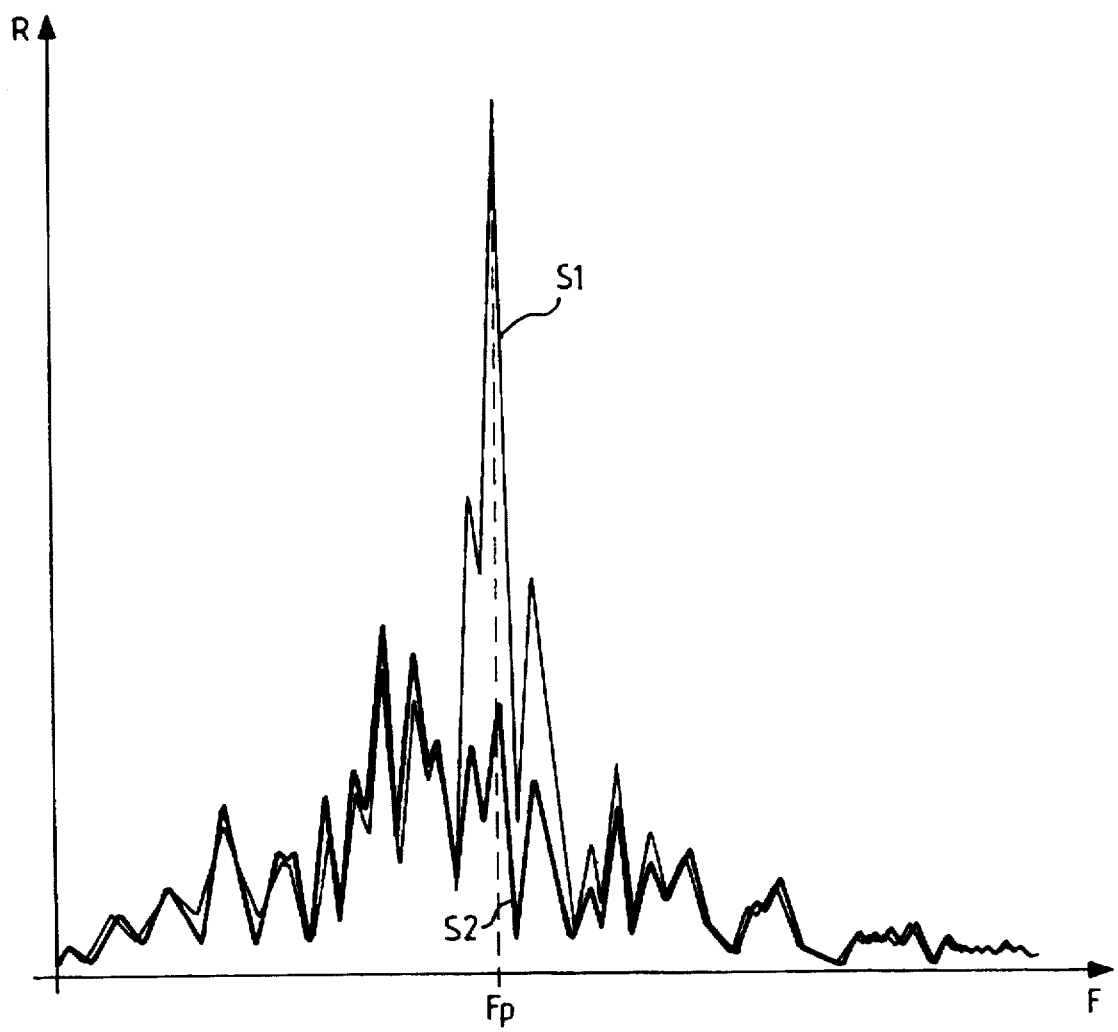
FIG. 4 illustrates the reduction in vibrations which is obtained by a device in accordance with the invention.

In FIG. 4, the amplitude R of the vibrations of the structure of the helicopter 2 is represented as a function of the frequency F, on the one hand for an undamped structure (signal S1) of natural frequency Fp and, on the other hand for the same structure damped by the device 1 in accordance with the invention (signal S2). As may be observed, the response peak at the natural frequency Fp (of the signal S1) is very greatly attenuated by the device 1 in accordance with the invention.

We claim:

1. In a helicopter comprising:

a structure (5A) with a tail boom (5) and a fin (D), said structure having a longitudinal vertical mid-plane (P); and a main lift and propulsion rotor (3) generating an aerodynamic flow passing through said rotor and inducing vibrations on said structure, a damping device for reducing said vibrations which:

comprises a longitudinal chamber (9) which is equipped with at least one central restriction (9A) and with two elastically urged mobile lateral walls (10, 11) and which is full of a fluid (FL) representing an oscillating mass; and is mounted in said tail boom (5) close to said fin (D) so that the direction (X—X) of travel of said oscillating mass (FL) is at least substantially orthogonal to said longitudinal vertical mid-plane (P).

2. The device as claimed in claim 1, wherein said chamber (9) has a cylindrical shape.

3. The device as claimed in claim 2, wherein said fluid (FL) is a viscous liquid.

4. The device as claimed in claim 2, wherein the elastic urging on the mobile walls (10, 11) is produced by pneumatic springs.

5. The device as claimed in claim 2, wherein the elastic urging on the mobile walls (10, 11) is produced by mechanical springs (13).

* * * * *